March 15, 1932.　　　C. E. BALL　　　1,849,729
TRACTOR CHAIN
Filed March 20, 1930　　4 Sheets-Sheet 1
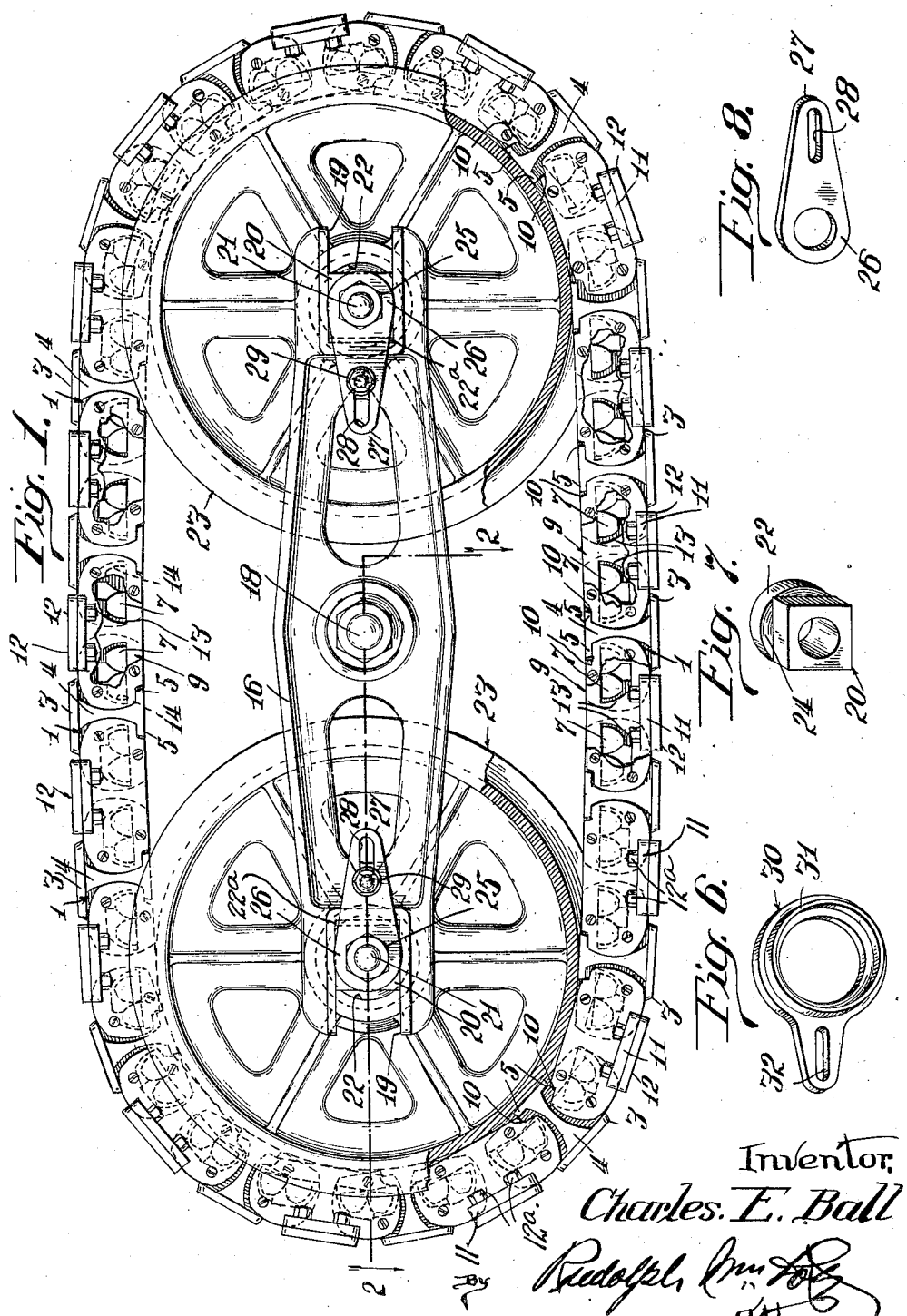
Inventor,
Charles E. Ball March 15, 1932.  C. E. BALL  1,849,729
TRACTOR CHAIN
Filed March 20, 1930   4 Sheets-Sheet 2
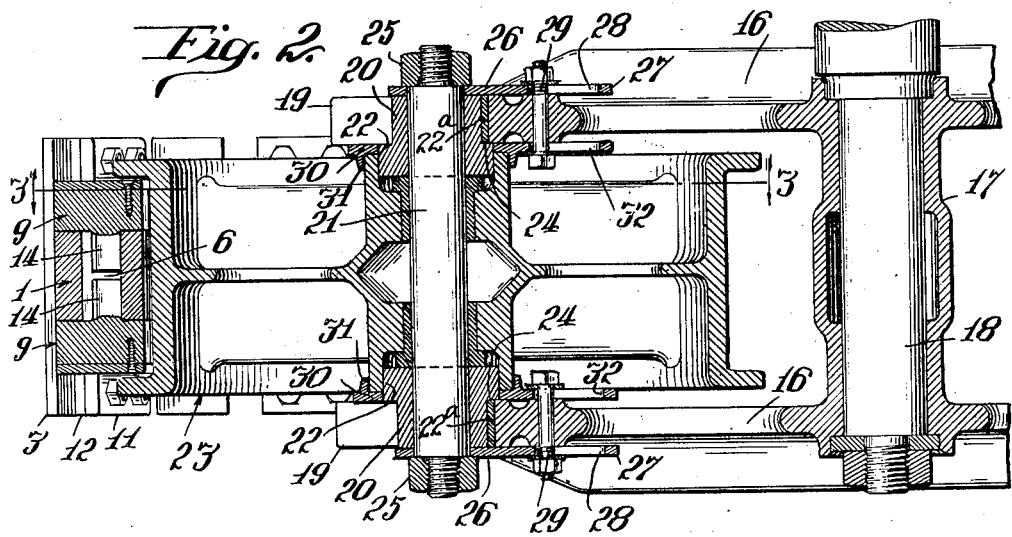
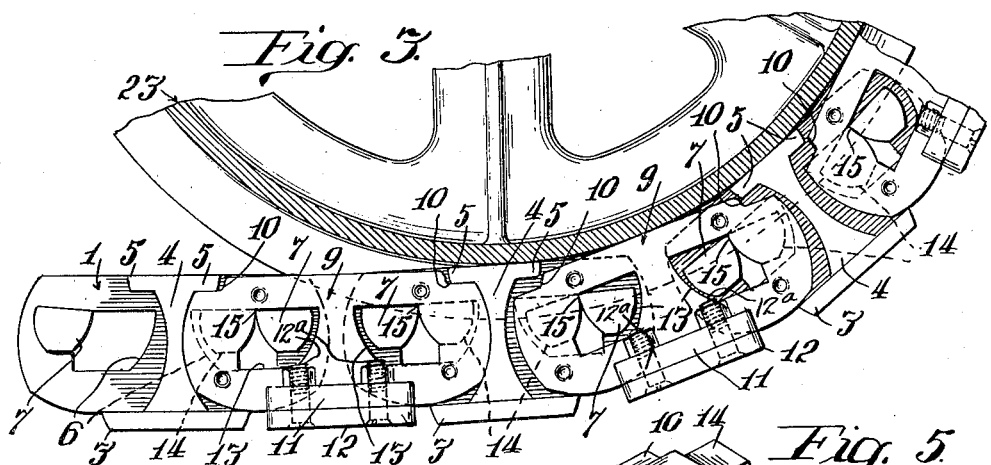
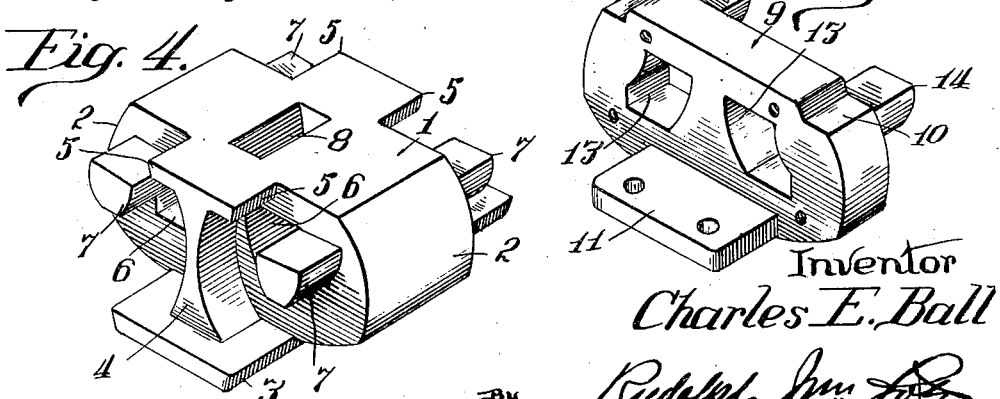
Inventor
Charles E. Ball
By Rudolph [illegible]
Attorney

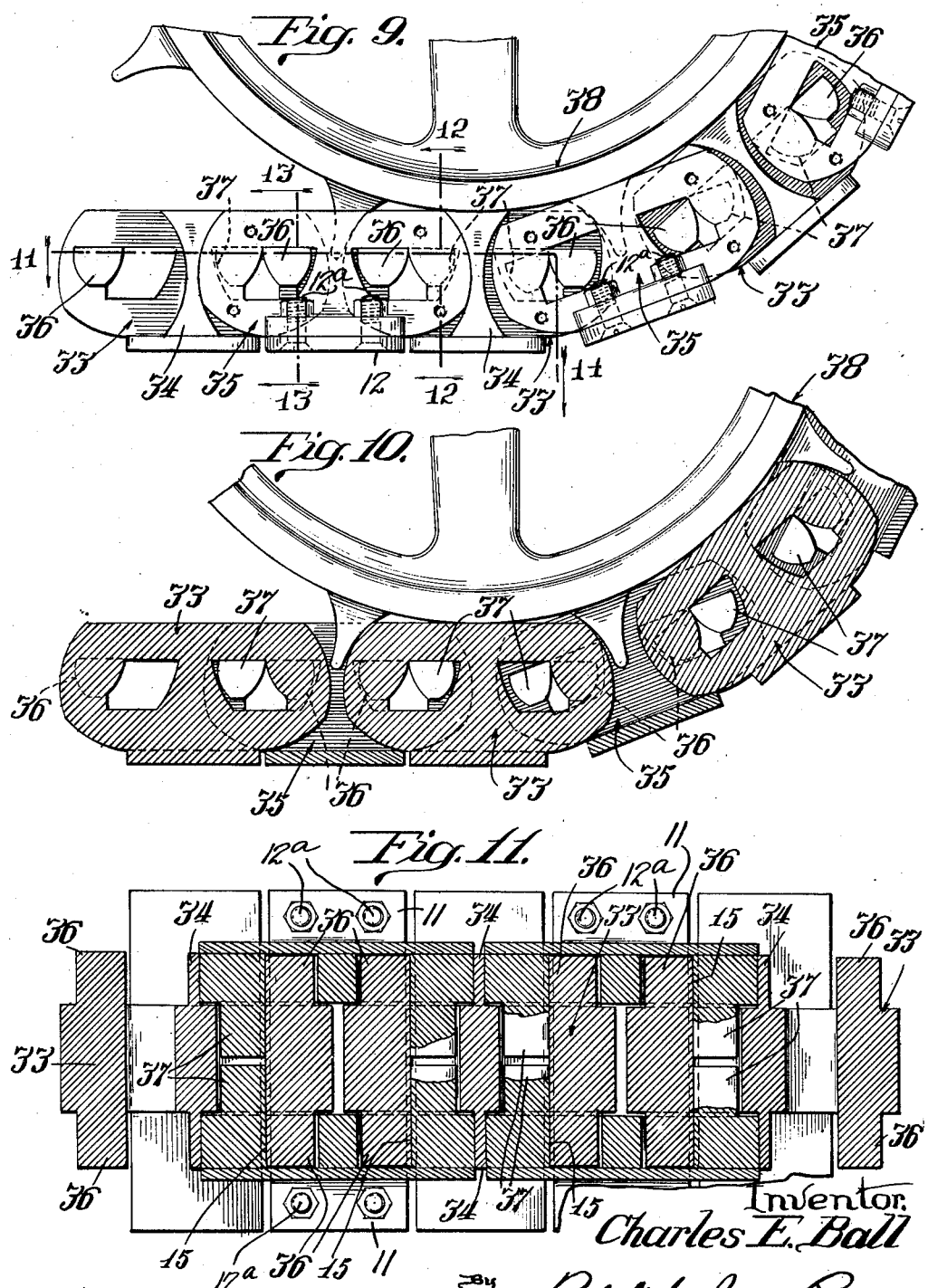

March 15, 1932.                C. E. BALL                1,849,729
                              TRACTOR CHAIN
                     Filed March 20, 1930    4 Sheets-Sheet 4
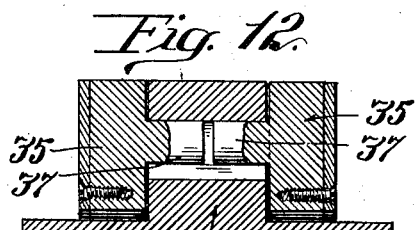
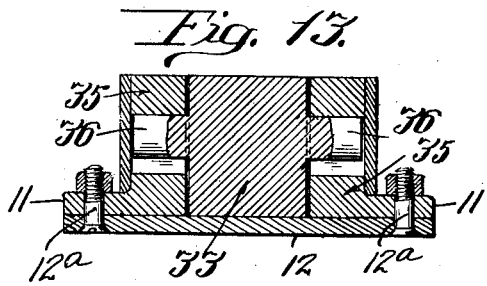
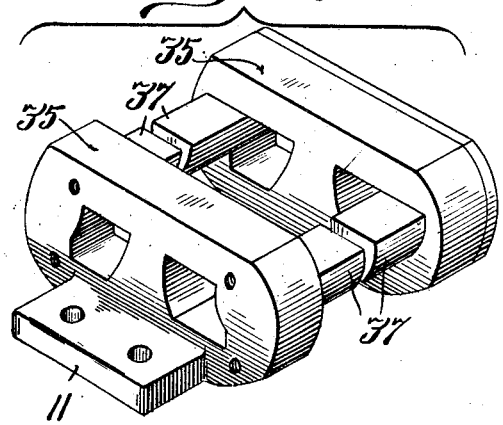
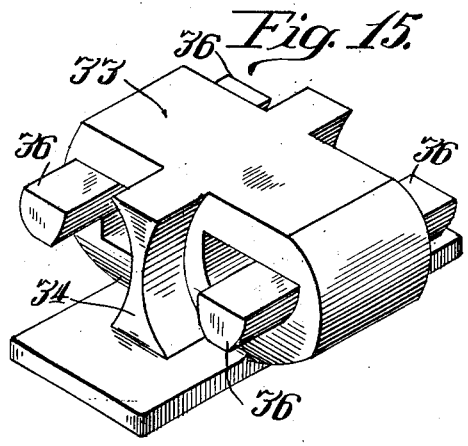
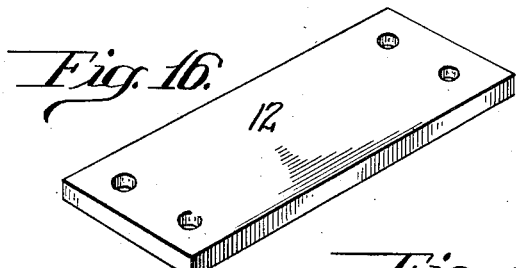
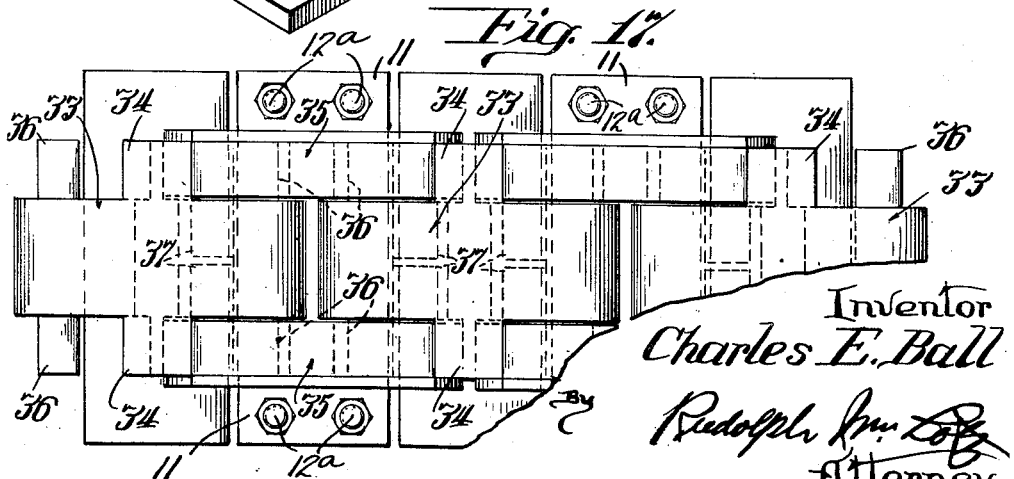

Patented Mar. 15, 1932

1,849,729

UNITED STATES PATENT OFFICE

CHARLES E. BALL, OF CHICAGO, ILLINOIS, ASSIGNOR TO BALL WAGON GRADER COMPANY, OF STOCKTON, CALIFORNIA, A CORPORATION

TRACTOR CHAIN

Application filed March 20, 1930. Serial No. 437,476.

This invention relates to improvements in chains and more particularly to improvements in tractor chains and the like and has for one of its main objects to provide a structure of this character, the component links of which may be cast of suitable metal and assembled without requiring machining of said links or interengaging parts thereof.

A further essential object of the invention is to provide a structure of the type aforesaid wherein the component links are so interengaged and associated as to cooperate to render the structure inflexible against pressure exerted upon the exterior peripheral surface thereof to thereby cause the same to provide what may be termed a bridge-structure between the vertical planes of the axes of the wheels over which the chain is trained whereby the chain is caused to afford a rigid support for the load carried by the axles or shafts of the said wheels.

Another essential object of the invention is to so construct and assemble the links of the chain structure as to permit or cause a slight relative longitudinal movement of the component links thereof when the chain is in action.

A further essential object of the invention is to provide a chain of the type specified which is or may be efficiently housed to prevent easy access of dirt to the interengaging wearing surfaces thereof and which, furthermore, may easily be disassembled for purposes of cleaning, replacement and repair.

The invention may be variously embodied and in the accompanying drawings I have illustrated several embodiments thereof.

In said drawings:

Fig. 1 is a side elevation of a pair of wheels and a chain structure trained over the same, all constructed in accordance with the invention.

Fig. 2 is a plan section on the line 2—2 of Fig. 1.

Fig. 3 is a fragmentary vertical longitudinal section of the same on the line 3—3 of Fig. 2.

Figs. 4 and 5 are perspective views showing the two types of component links of the structure.

Figs. 6, 7 and 8 are perspective views of parts of the wheel structure of Fig. 1.

Fig. 9 is a fragmentary side elevation of another embodiment of the invention differing slightly from the structure of Figs. 1 to 5, inclusive.

Fig. 10 is a fragmentary detail vertical section of the chain of Fig. 6, the sprocket wheel over which the same is trained being shown in elevation.

Fig. 11 is a fragmentary plan section of the chain on the line 11—11 of Fig. 9.

Figs. 12 and 13 are transverse sections on the lines 12—12 and 13—13, respectively, of Fig. 9.

Figs. 14 and 15 are perspective views of the component links of the chain of Fig. 9.

Fig. 16 is a perspective view of a foot or traction plate for the pair of link elements of Fig. 14.

Fig. 17 is a fragmentary top plan view of the chain of Fig. 9.

The chain structure of Fig. 1 comprises two types of links, one of which is a unitary structure such as a steel or steel alloy casting, illustrated in Fig. 4. These links are alternated with composite links each consisting of a pair of members as shown in Fig. 5.

The link of Fig. 4 comprises a body portion 1 presenting a flat or plane upper face, convex arcuate or substantially arcuate end faces 2, which are substantially portions of an imaginary cylinder of which the top face of said body is a cord-plane.

The lower face of the member 1 is coincident with the top face of the traction plate or shoe 3 which includes projecting end portions, said shoe being of less width than the length of the body portion, the end portions of the lower face of the latter being substantially arcuate and convex.

Midway between its ends, said body portion is provided at each side with a projecting member 4 extending from its top face to the shoe 3. Each member 4 is in the nature of a reinforcing rib having concave side faces and side flanges 5 at its upper end so that in side elevation, it closely resembles the letter T in shape.

At each side of the members 4, and spaced from the concave side faces of the same, the body member is pierced by transversely extending openings 6 which, as shown clearly at the left-hand side of Fig. 3, have top and bottom walls parallel or substantially parallel with the top face of the member 1. The walls of said openings 6 nearest adjacent to the members 4 are arcuate and concave, whereas the other or outer end faces of said openings are arcuate and convex from their upper ends to a point spaced from the bottom walls of said openings, the remaining portions of said outer end walls of said openings 6 being flat and perpendicular to the top and bottom walls. The latter are offset from each other longitudinally of the member 1.

Outwardly of said openings 6 and projecting from the side faces of the body member 1, are what I term trunnion elements 7 each having a flat upper face spaced from the plane of the lower faces of the flanges 5 of the members 4. The side faces of said trunnion elements 7 are arcuate and convex and converge toward the flat lower faces of said members 7. The upper faces of the latter are slightly angularly disposed with respect to the upper face of the member 1, the slant of said faces being upwardly toward the outer ends of the upper face of the member 1. The length of the upper face of each of the trunnion members 7, longitudinally of the member 1, is slightly less than the length of the upper wall of each of the openings 6 of said member.

This link is, as above stated, preferably a unitary casting though, of course, the shoe 3 may be a separate member suitably secured to the body member 1. In the event that the chain is to be engaged with sprocket wheels, the said body member 1 will be provided with a central opening 8 to receive a sprocket tooth.

The links alternating with those first above described, consist each of two equal members shown in Fig. 5, each consisting of a body portion 9 having a flat top face terminating at corner recesses 10 which receive the flanges 5 of the aforesaid link. The body portion 9 is of the same depth as the body member 1 and is provided on its outer face with a flange 11 to which one side portion of a shoe-plate 12 is adapted to be bolted. Said body portion 9 is also pierced by openings 13 corresponding in shape and size with the openings 6 and is equipped with trunnion elements 14 corresponding in shape, size, and location relatively to the openings 13 and the top face of the body portion 9 with the trunnion elements 7 of the link of Fig. 4, said trunnion elements 14 projecting from that face of the body portion 9 which is opposed to its companion member.

In assembling the chain, a pair of the links of Fig. 5 is associated with a link of Fig. 4 at one end of the latter by inserting the trunnion elements 14 at one end portion of the body portion 9 into the opening 6 of the unitary link, the trunnion elements 7 of the latter engaging in the openings 13 of the body portions 9. Each pair of body portions 9 is coupled by means of a shoe-plate 12 which is secured thereto by means of bolts 12a which pass through perforations in the said plate 12 and the flanges 11 of the links 9. In the assembled chain the top and bottom faces of the bodies 1 and 9 (hereinafter termed links 1 and 9) will be relatively positioned to form a substantially continuous surface which, in the spaces between the wheels over which the chain is trained will be slightly concave as shown in Fig. 1, this being due to the fact that the top faces of the trunnion elements 7 and 14 engage the top walls of the openings 13 and 6, respectively, and further, to the fact that the flanges 5 will engage the bottom walls of the corner recesses 10 to limit the relative pivotal movements of the links in one direction, this limitation of movement being effected by the trunnion elements independently of the flanges 5 and vice versa, the duplication of stop formations constituting a factor of safety and providing appreciably greater wear resisting surface, thus to increase the life of the links.

Owing to the fact that the top walls of the openings in the links 1 and 9 are of greater length than the upper faces of the trunnion members received therein, the component links of the chain are rendered capable of a slight relative longitudinal movement which occurs when the chain is in action in that portion thereof which lies beyond the ends of the tread portion. This free play or relative longitudinal movement of the links is very advantageous in that it permits the component links of the chain to adjust themselves nicely with respect to each other, both longitudinally and, to a very limited extent, laterally of the normal path of the links.

The extent of this limited relative longitudinal movement of the links proportionately to the length of the several links is fairly accurately illustrated in Figs. 1, 3, and 9.

This play or lost motion obviously permits contraction and expansion of the chain responsively to changes in temperature and, in instances (Fig. 3) where the chain is trained over pulleys, appears to cause the links to hug one of said pulleys very closely and remain quite loosely disposed about the other thereof and thus serves to reduce wear and tear on said pulleys due to chain slippage and also to reduce wear on the bearings for the said pulleys.

Thus the portion of the assembled chain structure spanning the space between the wheels over which the chain is trained and which rests upon the earth, constitutes a bridge formation to carry the full load of the said wheels and the load thereon.

In relative pivotal movement, the links turn on fulcrums coincident with the upper corners of the trunnion elements which are flush with the upper corners of the openings adjacent to said members in the same link. This fulcrum axis is continuous throughout the entire width of the chain as will be best understood by reference to Fig. 11 wherein the full lines 15 indicate the fulcrum axes.

By reference to Figs. 1, 3, 9, and 10, it will be noted that the fulcrum axis last referred to is substantially common to the trunnion members of companion links lying adjacent to each other but the structure is such that the said trunnion members of one of a set of companion links may move bodily away from the upper or inner walls of the openings of the other companion link or links as the said links pass around the wheels over which they are trained, such movement being very slight or limited.

Thus it will also be obvious that, in effecting limitation of the relative pivotal movement of the links in one direction to thus provide the inflexible or rigid tread-bridge, the stop elements consisting of the upper faces of the trunnion members and the upper walls of the openings in which the same are received, are disposed upon opposite sides of each of said fulcrum axes and extend into close proximity to the vertical plane of the middle of each link. Hence, the strains and stresses to which the trunnion members are subjected, while disposed within the tread-bridge, are very widely distributed and are not subjected to appreciable leverage exerted by load on said bridge portion but rather to the direct action of said load. The interengagement of the flanges 5 with the bottom walls of the recesses 10 is a secondary stop means constituting an additional safety factor of the structure.

In the instant structure, the mid-ribs 4 and 34 of the inner links have arcuate, concave, side faces opposed to and fitting the convex arcuate ends of the outer links and are in the nature of stop-formations to limit the relative longitudinal movement of contiguous links in one direction. The said mid-ribs also constitute reinforcing elements.

The above chain structure may be trained over either sprocket wheels as when mounted on a motor propelled vehicle, or over ordinary wheels as when mounted on a trailer or vehicle which is drawn by power other than a motor carried thereby. In either case the wheels over which the chain is trained must be adjustable as to spacing of axis of rotation in order to maintain the chain taut as by taking up wear. It is obviously very essential that, in effecting such adjustments, the axes of rotation of the wheels shall be maintained absolutely parallel with each other and the wheels themselves maintained accurately aligned with each other.

An exemplary wheel structure suitable for the chain of this invention is shown in Figs. 1 and 2 wherein a pair of rocking beams 16 equipped with an integral hub 17 is shown mounted upon an axle 18 of the vehicle. These beams 16 are provided with bifurcated ends 19 which receive the square bearings 20 for the axles 21, said bearings having cylindrical end portions 22. The hubs of the wheels 23 are provided with bores annularly enlarged at their ends to receive said cylindrical end portions of said bearings. The shoulders 24 of said bearings bear upon the inner side faces of the bifurated ends of said beams.

The axles 21 have threaded projections at their ends to receive the nuts 25 which bear upon the outer faces of washers 26 provided with projections 27 provided with longitudinal slots 28 through which bolts 29 pass. Similar washers 30 (see Fig. 6) wherein the opening is bordered by an annular rib 31 receiving the end of the hub of a wheel 23, the openings in said washers 30 receiving the cylindrical portions of said bearings 20, the said bolts 29 also passing through the longitudinal slots 32 of said washers 30, the latter and the washers 26 being thus clamped upon opposite side faces of the end portions of the beams.

As said bearings 20 are moved away from the inner ends walls of the recesses containing the same, metal plates 22a of a suitable thickness are inserted into the free spaces back of said bearings to thus prevent the said bearings from moving back to initial positions and also coact with the washers 26 and 30 and bolts 29 to prevent said bearings 20 from becoming angularly disposed.

The pair of wheels 23 being carried by the rocker beams 16, permit the tread portions of the chains to adjust themselves to the angles of the surface over which they travel and, by reason of the bridge formation due to limitation of relative pivotal movement of the links of the chain resulting from contact of the shoulders 10 with the flanges 5 and the top surfaces of the members 7 and 14 with the top walls of the openings 13 and 6, respectively, the load carried by the axle 18 is carried by the portions of the chains spanning the spaces between the wheels so that the full benefit of the traction surface of said chains is obtained.

In the structure of Figs. 9 to 17, inclusive, the links 33 are provided with side projections 34 similar to the projections 4 of the links 2 but are devoid of the flanges 5 and the companion links 35 are devoid of the recesses providing the shoulders 10. The top faces of the trunnion members 36 and 37, respectively, of the links 33 and 35, are disposed in a common plane so that said links form a straight instead of a convex bridge formation along the tread portion between the wheels over which the said chain is trained.

In said Fig. 9 et seq. the teeth of the sprocket wheels 38 are shown as engaging in free spaces between the links 33 and 35 and, in the case of the structure of Figs. 1 to 8, this arrangement may also be adhered to and the openings 8 omitted.

It will be noted that in each of the chain structures, the equal parts of the two-piece links may be cast from the same pattern and, while the coupling means for said equal parts is shown as consisting of tread plates, it will be obvious that said parts may be otherwise suitably coupled.

I claim as my invention:

1. An articulate structure of the type specified comprising a series of links, alternate links of said structure each consisting of two equal members disposed parallel with each other and equipped on their opposed faces with pairs of trunnion elements, the remaining links each comprising a body member provided on its side faces with pairs of trunnion elements, said respective members being each provided with openings inwardly of its trunnion elements for receiving the trunnion elements of companion members, the trunnion elements of said several links having flat upper faces, and said openings having flat upper walls for engaging said flat faces of said trunnion elements to limit the relative pivotal movement of alternate links in one direction to thereby maintain the tread portion of the chain structure unyielding to ground pressure at any point thereon, and means for coupling the equal members of the first-named links after assembly thereof with said other links.

2. An articulate structure of the type specified comprising a series of links, alternate links of said structure each consisting of two equal members disposed parallel with each other and equipped on their opposed faces with pairs of trunnion elements, the remaining links each comprising a body member provided on its side faces with pairs of trunnion elements, said respective members being each provided with openings inwardly of its trunnion elements for receiving the trunnion elements of companion members, the trunnion elements of said several links having flat upper faces, and said openings having flat upper walls for engaging said flat faces of said trunnion elements to limit the relative pivotal movement of alternate links in one direction to thereby maintain the tread portion of the chain structure unyielding to ground pressure at any point thereon, said interengaging flat faces including inclined faces coacting to maintain the active tread surface of the chain structure substantially convex longitudinally thereof, and means for coupling the equal members of the first-named links after assembly thereof with said other links.

3. A chain structure of the type specified comprising one set of links each consisting of a single integral member and another set of links each consisting of two equal members, the links of one set being alternated with those of the other set, said first-named links equipped on their side faces with pairs of projecting trunnion elements adjacent the ends thereof and provided inwardly of said trunnion elements with openings, and provided midway between their ends with outwardly extending stop projections, the equal members of the other links being equipped adjacent their ends on their opposed faces with trunnion elements and provided inwardly of the latter with openings, the trunnion elements of one set of links being engaged in the openings of the other set of links, the said equal members being provided at their ends with stop formations for engaging the stop projections of the other set of links thereby to limit the relative pivotal movement of alternate links in one direction.

4. A chain structure of the type specified comprising one set of links each consisting of a single integral member and another set of links each consisting of two equal members, the links of one set being alternated with those of the other set, said first-named links equipped on their side faces with pairs of projecting trunnion elements adjacent the ends thereof and provided inwardly of said trunnion elements with openings, and provided midway between their ends with outwardly extending stop projections, the equal members of the other links being equipped adjacent their ends on their opposed faces with trunnion elements and provided inwardly of the latter with openings, the trunnion elements of one set of links being engaged in the openings of the other set of links, said trunnion elements and openings having coacting means permitting free relative pivotal movement of alternate links in one direction and limiting such relative pivotal movement in the other direction, the said equal members being provided at their ends with stop formations for engaging the stop projections of the other set of links to limit thereby the relative pivotal movement of alternate links in one direction.

5. A chain structure comprising links disposed in overlapping relation to each other with respect to their side faces, each of said links being equipped adjacent each of its end portions with a trunnion element projecting from the side face portions thereof opposed to contiguous overlapping links, and each of said links being provided with openings disposed between said trunnion elements and the middle portion thereof in which the trunnion elements of adjacent links engage, said openings being of greater dimensions than the trunnion elements engaged therein to permit relatively free movement of the said trunnion members therein and also permit limited expansion and contraction of the chain by a relative longitudinal movement of said links, each of said links being engaged with each contiguous link at two points longitudinally spaced from the middle thereof and from each other and co-acting to limit the relative pivotal movement of interengaged links in one direction to thereby render the tread portion of the chain inflexible, while permitting free relative pivotal movement of said links in the opposite direction, all of said links having arcuate convex ends and alternate links being equipped with mid-ribs having arcuate concave side faces opposed to the ends of contiguous links.

6. A chain structure comprising links disposed in overlapping relation to each other with respect to their side faces, each of said links being equipped adjacent each of its end portions with a trunnion element projecting from the side face portions thereof opposed to contiguous overlapping links, said trunnion elements having their upper faces spaced from the upper longitudinal edges of the links and having arcuate opposed side faces, each link being provided inwardly of said trunnion elements with openings having upper walls substantially aligned with the upper faces of the trunnion elements and having arcuate end walls substantially flush with the opposed arcuate faces of said trunnion elements, each of said trunnion elements of each link engaging in an opening in a contiguous link, all of said links having arcuate convex ends and alternate links being equipped with mid-ribs having concave arcuate faces opposed to the ends of contiguous links.

7. A chain structure comprising links disposed in overlapping relation to each other with respect to their side faces, each of said links being equipped adjacent each of its end portions with a trunnion element projecting from the side face portions thereof opposed to contiguous overlapping links having flat upper faces and opposed convex arcuate side faces, each link being also provided with openings disposed between said trunnion elements and the middle thereof and having flat upper walls and arcuate outer end walls, the latter being concentric with the arcuate opposed faces of said trunnion elements, each of said trunnion elements of each link engaging in an opening in a contiguous link, all of said links having arcuate convex ends and alternate links being equipped with mid-ribs having concave arcuate faces opposed to the ends of contiguous links.

8. A chain structure comprising links disposed in overlapping relation to each other with respect to their side faces, each of said links being equipped adjacent each of its end portions with a trunnion element projecting from the side face portions thereof opposed to contiguous overlapping links having flat upper faces and opposed convex arcuate side faces, each link being also provided with openings disposed between said trunnion elements and the middle thereof and having flat upper walls and arcuate outer end walls, the latter being concentric with the arcuate opposed faces of said trunnion elements, each of said trunnion elements of each link engaging in an opening in a contiguous link, all of said links having arcuate convex ends and alternate links being equipped with mid-ribs having concave arcuate faces opposed to the ends of contiguous links, the said flat faces of said trunnion elements and flat top walls of said openings interengaging to limit the relative pivotal movement of said links in one direction.

9. A chain structure comprising links disposed in overlapping relation to each other with respect to their side faces, each of said links being equipped adjacent each of its end portions with a trunnion element projecting from the side face portions thereof opposed to contiguous overlapping links having flat upper faces and opposed convex arcuate side faces, each link being also provided with openings disposed between said trunnion elements and the middle thereof and having flat upper walls and arcuate outer end walls, the latter being concentric with the arcuate opposed faces of said trunnion elements, each of said trunnion elements of each link engaging in an opening in a contiguous link, all of said links having arcuate convex ends and alternate links being equipped with mid-ribs having concave arcuate faces opposed to the ends of contiguous links, the said flat faces of said trunnion elements and flat top walls of said openings interengaging to limit the relative pivotal movement of said links in one direction, and said openings permitting free movement of the trunnions engaged therein to throw the faces thereof out of contact with each other.

CHARLES E. BALL.